Aug. 16, 1938.                    H. E. HALL                    2,127,405
                              TRACTOR SWEEP RAKE
                       Filed Nov. 2, 1937          3 Sheets-Sheet 2
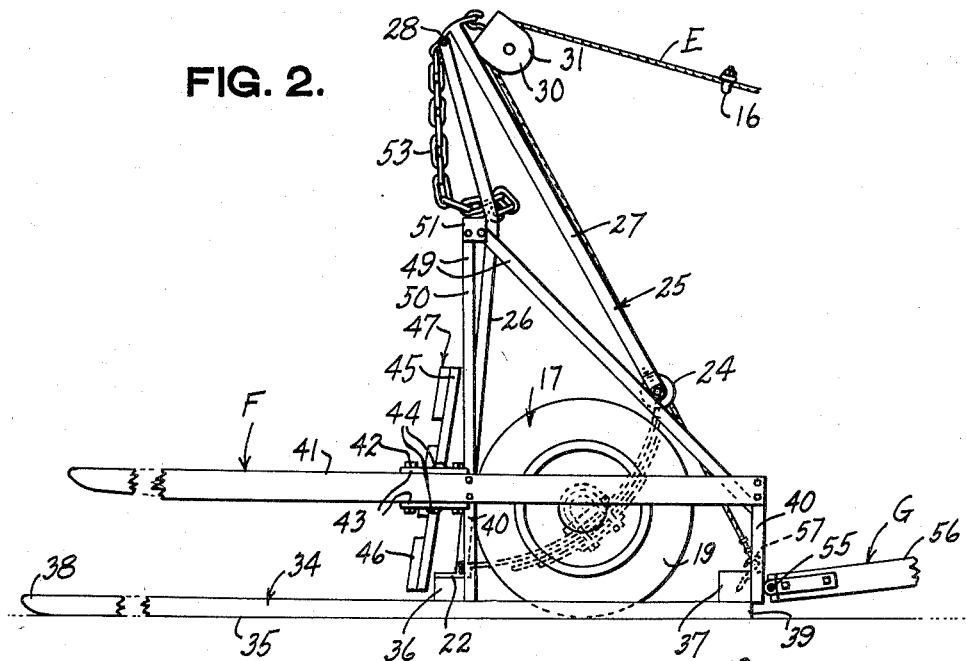
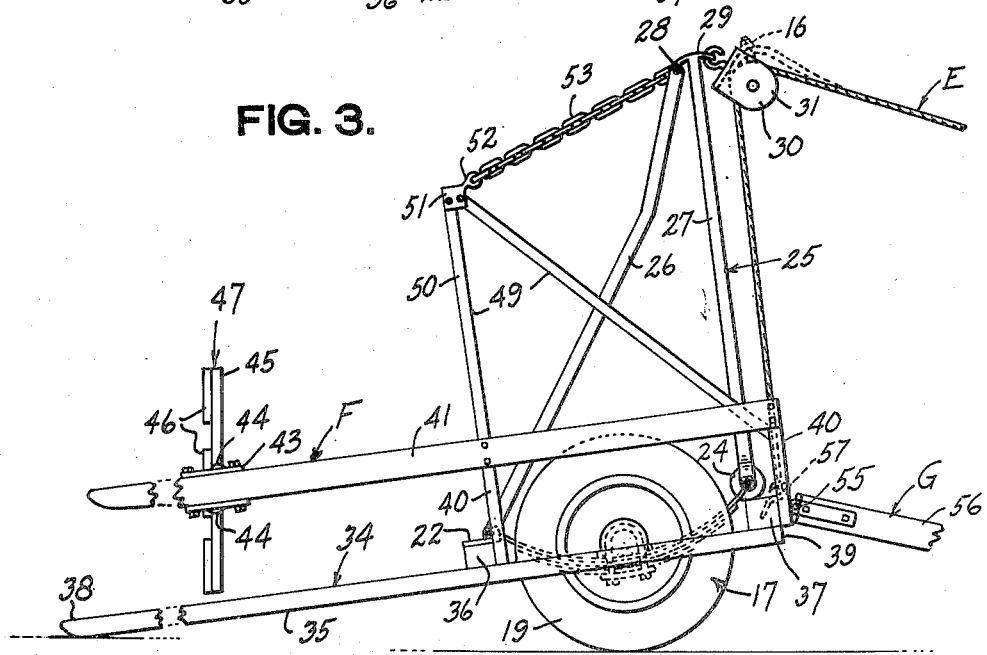
INVENTOR.
Howard E. Hall
BY Lancaster, Allwin Rommel
ATTORNEYS.

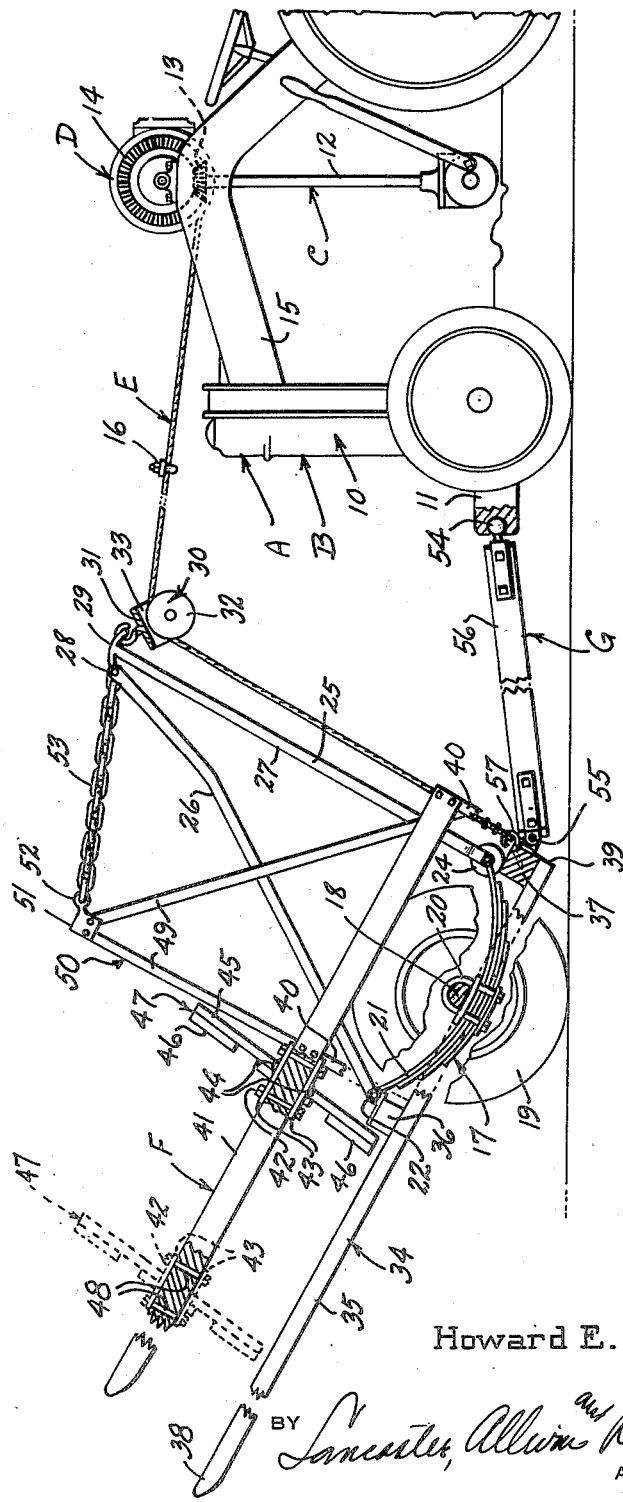

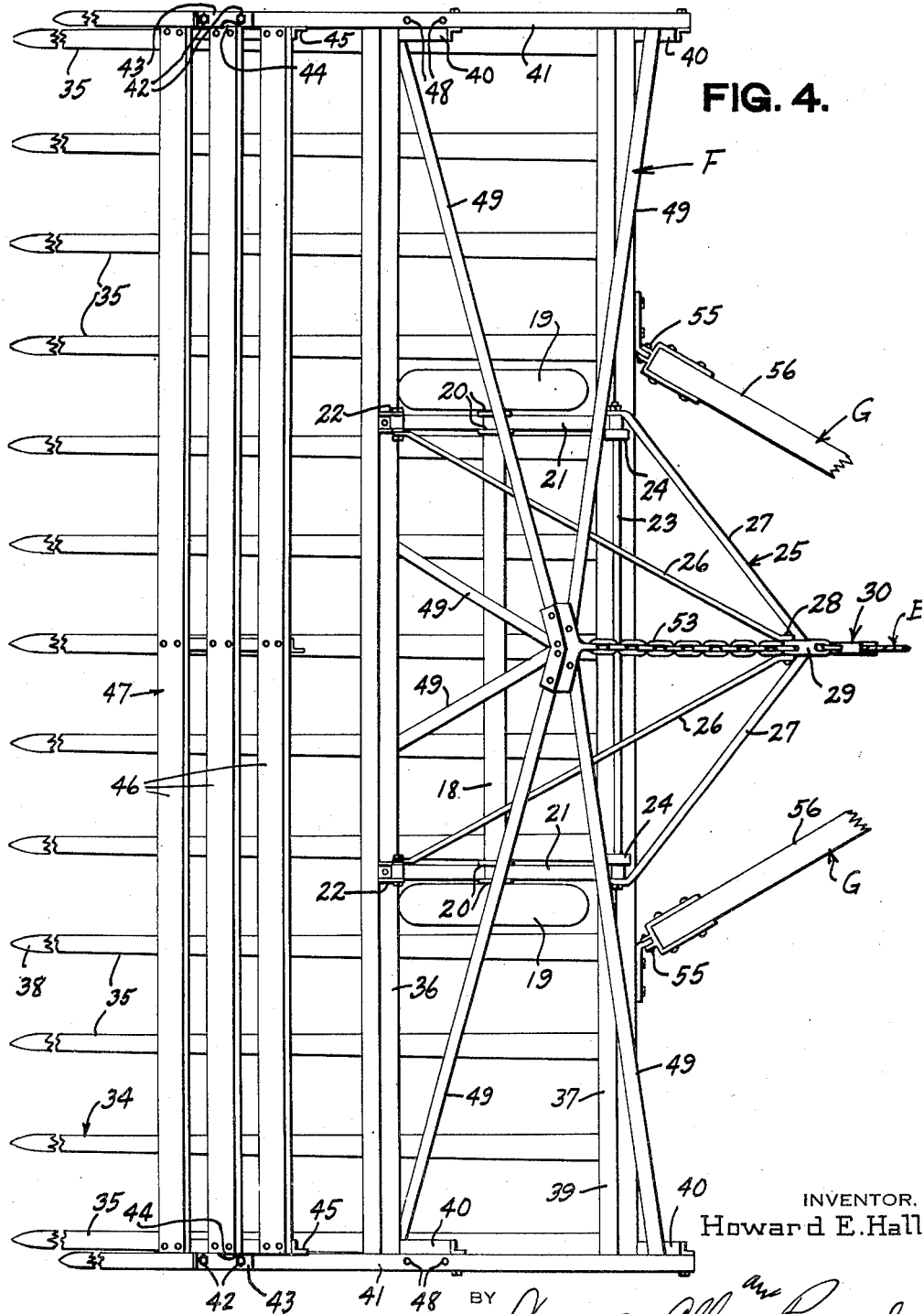

Patented Aug. 16, 1938

2,127,405

UNITED STATES PATENT OFFICE 2,127,405

TRACTOR SWEEP RAKE

Howard E. Hall, Eagle, Idaho

Application November 2, 1937, Serial No. 172,481

11 Claims. (Cl. 56—27)

The present invention relates to improvements in implements, such as tractor sweep rakes, for gathering, lifting, transporting and unloading material, such as hay or other crops.

An important object of the invention is to provide a tractor propelled sweep rake provided with a wheeled axle suspension permitting tilting of the rake frame to various raised and lowered positions.

Another object of the invention is to provide a sweep rake frame having a wheeled axle suspension permitting the rake frame to be pivotally dropped to a position flat upon the ground.

Another object of the invention is to provide an improved resilient suspension for the rake frame which will permit the rake teeth thereof to conform with ground irregularities, in order to rake clean and also permit high speed travel over rough ground.

A further object is to provide a tractor propelled sweep rake controllable by means of a cable connected with a cable winding drum mounted upon the tractor.

A still further object of the invention is to provide an improved scoop-like rake frame having an adjustable bulkhead or backstop which may be set forwardly of the rake frame for sweeping and bunching the material into loads of proper shape for hauling, and which bulkhead may be set back to increase the effective length of the scoop-like rake frame and enable the teeth thereof to penetrate beneath a load whereby the rake frame may lift and haul clean.

Other objects and advantages of the invention will become apparent during the course of the following detailed description, taken in connection with the accompanying drawings, forming a part of this specification and in which drawings:—

Figure 1 is a fragmentary view partly in side elevation and partly in vertical section and showing the relationship of the tractor and the sweep rake when the sweep rake is in an elevated material-hauling position.

Figure 2 is a fragmentary view in side elevation of the sweep rake in its dropped loading and unloading position.

Figure 3 is a fragmentary view in side elevation showing the sweep rake in a tilted raking position.

Figure 4 is a fragmentary top plan view showing the sweep rake in an elevated position similar to that of Figure 1.

In the drawings, which for the purpose of illustration show only a preferred embodiment of the invention and wherein similar reference characters denote corresponding parts throughout the several views, the letter A may generally designate the improved tractor and sweep rake assembly, wherein the tractor B is provided with power take-off means C for rotating a hoisting or winding drum D mounted on the tractor and provided with a cable E, operatively connected to the sweep rake F, which is disposed in spaced relation, forwardly of the tractor and pivotally connected thereto by a link G.

The tractor B may be of any suitable type including the usual power plant 10 for propelling the tractor and a suitable forwardly disposed hitch portion 11.

Connected to the power plant 10 is a power-take-off means C which may include a driveshaft 12 provided with a drive pinion 13 meshing with a ring gear 14 on one side of the winding drum D, which may be supported upon the tractor by a suitable bracket 15.

Releasably secured to the cable E and in encircling relation thereto, is a clamp 16 forming an adjustable enlargement or abutment thereon.

Referring now to the improved sweep rake F, the same may comprise a rake frame support 17 including an axle 18 provided with a pair of spaced apart ground wheels 19. Secured transversely of the axle as by suitable saddles 20 are a pair of spaced-apart semi-elliptic type springs 21 extending forwardly and rearwardly of the axle and provided at their forward ends with suitable pivotal shackle connections 22, and at their rearward ends with a tierod 23 on which is rotatably mounted a pair of spaced-apart rollers 24. The rake frame support 17 may further comprise a bracket 25 including upwardly convergent links 26—27 respectively pivoted at their lower ends to the shackles 22 and tierod 23, and pivotally connected together at their upper ends as by pin 28. The upper end of the link 27 may be formed with a loop or eye portion 29 carrying a pulley 30 including a frame 31 and wheel 32 between which a restricted passageway 33 for the cable E is formed, but which passageway is too small to accommodate the clamp 16. The sweep rake F may further comprise a scoop-like rake frame 34 including a plurality of elongate bottom teeth 35 secured in parallel co-planar relation by spaced apart crossbars 36—37 forming a forward raking end 38 and a rearward head end 39. The crossbar 36 may be positioned intermediate the ends of the teeth 35 while the crossbar 37 is secured at the rear ends thereof.

Projecting upwardly from the ends of the crossbars 36—37 are risers 40, supporting, in spaced parallel relation to the bottom teeth 35, a pair of opposite side teeth 41.

Releasably fastened, as by bolts 42, to the side teeth 41 are plates 43, secured as by welds 44 to angle irons 45 which support a plurality of spaced crossboards 46 of the bulkhead 47. The side teeth may be provided with forward and rearward sets of bolts holes 48 so that the position of the bulkhead with respect to the side and bottom teeth may be adjusted.

Extending upwardly of the risers and crossbars are convergent struts 49 forming a pyramidal standard or turret 50 having at its apex a fixed cap 51 provided with an eye portion 52 to which is attached one end of a chain 53.

The rake frame 34 preferably is tiltably secured to the rake frame support 17 by fastening the shackle connections 22 to the crossbar 36, with the head end of the frame disposed beneath the axle 18. The arrangement of parts preferably is such that relative pivotal action between the rake frame and its support will carry the rollers 24 into or out of engagement with the rear crossbar 37.

At its opposite end the chain 53 is connected to the pin 28 of the bracket 25. Preferaby, the chain is of a length no greater than that necessary to permit relative tilting of the frame and its support to a position wherein the rollers 24 contact the rear crossbar 37.

Referring to the V-shaped link G, the same may be provided at its vertex with a ball and socket joint 54 connecting with the tractor hitch portion 11, and with pivot joints 55 connecting the two legs 56 at their divergent ends to the rear crossbar 37.

With the cable E trained about the pulley wheel 32 and attached as by means of a hook 57 to the rear crossbar 37, the sweep rake may be operated by the cable winding drum D, as follows:—

Assuming the position of parts to be as shown in Figure 2 of the drawings, wherein the rake frame is resting flat upon the ground, and that it is desired to tilt the frame to a raking position, when the winding drum is operated to reel in the cable E, the resultant upward pull on the crossbar 37 and the downward reaction upon the pulley 30 will lift the head end of the frame. The frame 34 will pivot about the axes of the shackle connections 22, while the frame support 17 will gradually rock backwardly until the rollers 24 descend into engagement with the crossbar 37, whereupon the chain 53 will become taut, as shown in Figure 3. Raking may be accomplished with the frame tilted to any desired position intermediate the positions shown in Figures 2 and 3, by reeling in or paying out cable at the drum D. It will be noted that in any such intermediate position, the head end of the frame will be resiliently suspended by the shackle connections 22 and also by the cable E, which is resiliently carried by the pivoted bracket 25 at the pulley 30. If it is desired to elevate the frame to a high position suitable for transporting material clear of the ground, the winding drum is operated to further reel in the cable whereupon the frame will rock backwardly with the axle 18 as the fulcrum to the position shown in Figures 1 and 4 and thereby lift the raking end of the frame well above ground. The rollers 24 mounted on the tierod 23 may rotate when in contact with the frame, whereby to serve in the capacity of spring shackles, and permit the springs to flex. In bunching or sweeping the rake frame may be held in any desired forwardly and downwardly tilted position by adjusting the clamp 16 to a position on the cable E, such as shown in dotted lines in Figure 3, where it will engage the pulley 30 and thereby hold the rear end of the frame off the ground. Otherwise the clamp may be moved backwardly along the cable as shown in Figure 2, so as not to interfere with dropping of the rake frame tc the ground.

The bulkhead 47 may be moved to its forward position for sweeping and bunching, as illustrated in Figure 3, or to its rearward hauling position as depicted in Figures 1 and 2, by merely removing the fastening bolts 42, sliding the bulkhead along the side teeth 41 to the correct location, and reinserting the bolts.

The bracket 25 acts not only to lift the rake frame at the shackle connections 22 but also to stabilize the frame in its various tilted or elevated positions.

It will be seen that an improved sweep rake has been provided and including a material raking and carrying frame which may be dropped into flat contact with the ground or stubble, whereby to unload hay or other crops unassisted.

Various changes may be made to the form of invention herein shown and described, without departing from the spirit of the invention or the scope of the following claims.

I claim:

1. The combination with a tractor having a cable-winding drum, of a sweep rake forwardly of the tractor and comprising a frame provided with a forward rake portion and a rearward head portion, a bar pivotally connecting the tractor and the head portion, a support for the frame comprising an axle transversely of the frame, ground wheels on the axle, and suspension means fixed to and extending forwardly of the axle, said frame at its head portion being pivotally secured to the suspension means forwardy of the axle, a pulley carried by the frame support above the head portion, and a cable wound upon the drum and having an end portion trained about the pulley and secured to the head portion.

2. The combination with a tractor having a cable-winding drum, of a sweep rake forwardly of the tractor and comprising a frame having a rake portion and a head portion, the head portion including a rearwardly disposed crossbar and a forwardly disposed crossbar, a link pivotally connecting the tractor and the rearwardly disposed crossbar, a support for the frame including a transversely disposed axle intermediate the crossbars, wheels rotatable on the axle, elongate springs secured to the axle and spanning the crossbars, said springs each being pivotally secured at one end to the forwardly disposed crossbar whereby the opposite end may swing into or out of engagement with the rearwardly disposed crossbar, a bracket including pairs of elongate upwardly convergent members, each pair of members being pivoted together at their upper end portions and being pivoted at their lower end portions each member to an opposite end of one of said springs, a pulley carried by the bracket above the rear crossbar, and a cable controlled by the drum, said cable being trained about the pulley and secured to the rear crossbar.

3. The combination with a tractor having a cable-winding drum, of a sweep rake disposed forwardly of the tractor and comprising a frame provided with a forward rake portion and a rearward head portion, a rigid link pivotaly connecting the tractor and the head portion, a frame support including an axle transversely above the frame, ground wheels rotatable on the axle, elongate suspension means secured transversely of the axle and including portions extending forwardly of the axle and pivotally secured to the frame, whereby the frame may rock upon the suspension means and the suspension means may rock upon the axle, a pulley secured to the frame support above the head portion, and a cable trained about the winding drum and pulley and connected to the head portion for controling the rocking of the frame and suspension means.

4. In a sweep rake, a support comprising an axle, ground wheels rotatable on the axle, and suspension means secured to and extending transversely of the axle, a frame provided with a forward raking end and a rearward head end and pivotally secured intermediate said ends to the suspension means forwardly of the axle, whereby the suspension means may rock upon the axle and the frame may rock upon the suspension means, and means controlling the rocking of the suspension means and the frame.

5. In a sweep rake, a frame comprising a rake portion and a head portion, the head portion including a pair of spaced-apart crossbars, a support for the frame including a transversely disposed axle intermediate the crossbars, wheels rotatable on the axle, elongate springs secured to the axle and spanning said crossbars, said springs each being pivotally secured at one end to one of said crossbars whereby the opposite end may swing into or out of engagement with the other of said crossbars, a bracket including pairs of elongate upwardly convergent members, each pair of members being pivoted together at their upper end portions and being pivoted at their lower end portions each member to an opposite end of one of said springs, and rigging operatively connected between the bracket and the frame for controlling the angular relation of the frame with respect to the support.

6. In a sweep rake, a frame including a head, a plurality of elongate bottom rails extending forwardly of the bottom portion of the head and terminating in raking teeth, a pair of elongate side rails each extending forwardly of the head in spaced parallel relation above the bottom rails, a bulkhead slidably carried by the side rails so as to form an adjustable backstop for material accumulating upon the bottom rails and means fixing the bulkhead to the side rails.

7. In a sweep rake, a support comprising an axle, ground wheels rotatable on the axle, elongate spring means secured to and extending laterally of the axle, roller means carried by the spring means at one side of the axle, pivot means carried by the spring means at the other side of the axle, a rake frame including a raking end and a head end, said frame being secured intermediate said ends to the pivot means, whereby the roller means may engage the head end of the frame, and means releasably holding the roller means in engagement with the head end of the frame.

8. In a sweep rake, a support comprising an axle, ground wheels rotatable on the axle, elongate spring means secured to and extending laterally of the axle, roller means carried by the spring means at one side of the axle, pivot means carried by the spring means at the other side of the axle, a bracket including upwardly convergent links pivotally secured at their lower ends to the spring means each at an opposite side of the axle and pivotally secured at their upper ends each to the other, a rake frame including a raking end and a head end, said frame being secured intermediate said ends to the pivot means, whereby the roller means may engage the head end of the frame, and rigging connected between the bracket and the head end releasably holding the roller means in engagement with the head end of the frame.

9. In a sweep rake, a rake frame support comprising an axle, ground wheels rotatable on the axle, elongate spring means secured to and extending laterally of the axle at opposite sides thereof, a bracket including upwardly convergent links pivotally secured at their lower ends to the spring means each at an opposite side of the axle and pivotally secured at their upper ends each to the other, a rake frame including a raking end and a head end, pivot means securing the frame intermediate its ends to the spring means at one side of the axle, a standard fixed to the frame and extending upwardly of the pivot means, a flexible connection between the upper end portions of the standard and the bracket whereby to limit relative pivotal movement of the rake frame and the rake frame support, and rigging connected between the bracket and the head end of the rake frame releasably holding the rake frame and the rake frame support in their limited relative pivotal positions.

10. In an implement of the character described, a support comprising an axle, ground wheels rotatable on the axle, a plurality of spaced apart elongate resilient members secured to and extending transversely of the axle at opposite sides thereof, a tierod securing the resilient members in spaced relation at one side of the axle, pivot means carried by the resilient members at the opposite side of the axle, a frame including a work engaging end and a head end, said frame being supported intermediate said ends by the pivot means, and means controlling the pivotal relation of the frame and the support.

11. In an implement of the character described, a support comprising an axle, ground wheels rotatable on the axle, a plurality of spaced apart elongate resilient members secured to and extending transversely of the axle at opposite sides thereof, a tierod securing the resilient members in spaced relation at one side of the axle, a roller rotatable on the tierod, pivot means carried by the resilient members at the opposite side of the axle, a frame including a work engaging end and a head end, said frame being supported intermediate said ends by the pivot means whereby the roller may engage the head end of the frame, and means releasably securing the roller in engagement with the head end of the frame.

HOWARD E. HALL.